March 3, 1953 — E. C. REYNOLDS — 2,630,325
WATER SOFTENER CONTROL MEANS
Filed Dec. 26, 1950 — 5 Sheets-Sheet 1

Fig. 1

INVENTOR.
EARL C. REYNOLDS
BY Everett W. Wright,
ATTORNEY

INVENTOR.
EARL C. REYNOLDS
BY Everett G. Wright
ATTORNEY

March 3, 1953 E. C. REYNOLDS 2,630,325
WATER SOFTENER CONTROL MEANS
Filed Dec. 26, 1950 5 Sheets-Sheet 5

INVENTOR.
EARL C. REYNOLDS
BY Everett G. Wright
ATTORNEY

Patented Mar. 3, 1953

2,630,325

UNITED STATES PATENT OFFICE 2,630,325

WATER SOFTENER CONTROL MEANS

Earl C. Reynolds, Detroit, Mich.

Application December 26, 1950, Serial No. 202,725

14 Claims. (Cl. 277—25)

This invention relates to water softening equipment and in particular to new and improved manual and semi-automatic control valve means for water softeners.

The primary object of this invention is to provide an improved, simple, economical, easy to install and readily manipulated manual and/or semi-automatic water softener control valve for use in accomplishing the shutting off from normal "Service" of zeolite crystal type water softeners, the regeneration thereof, and the returning of the water softeners back to "Service."

Another object of the invention is to provide a water softener control valve including a pressure sealed toggle lever operated selector valve element which accomplishes the Back-Wash, Drain & Salt, Re-fill, and Regeneration cycles of operation of the water softener from Service and back to Service with simple manual manipulation of the operating lever, including flow control in the Back-Wash cycle of operation and timed control of the Regeneration cycle of operation.

A further object of the invention is to provide an improved integral rotary multi-port and axial single port water softener control valve including toggle mechanism permitting easy manual valve manipulation from its Service position whereat the water softener functions normally, through Back-Wash, Drain & Salt, Re-fill and Regeneration cycles of operation of the water softener, and again back to Service, the single port valve element shutting off water supply to and through the water softener system while the multi-port rotary selector valve element is being turned from one selected operating position to another, and the multi-port rotary valve element being pressure sealed in its several operating positions.

Other objects of the invention will become apparent by reference to the following detailed description taken in connection with the accompanying drawings, in which.

Figure 1:
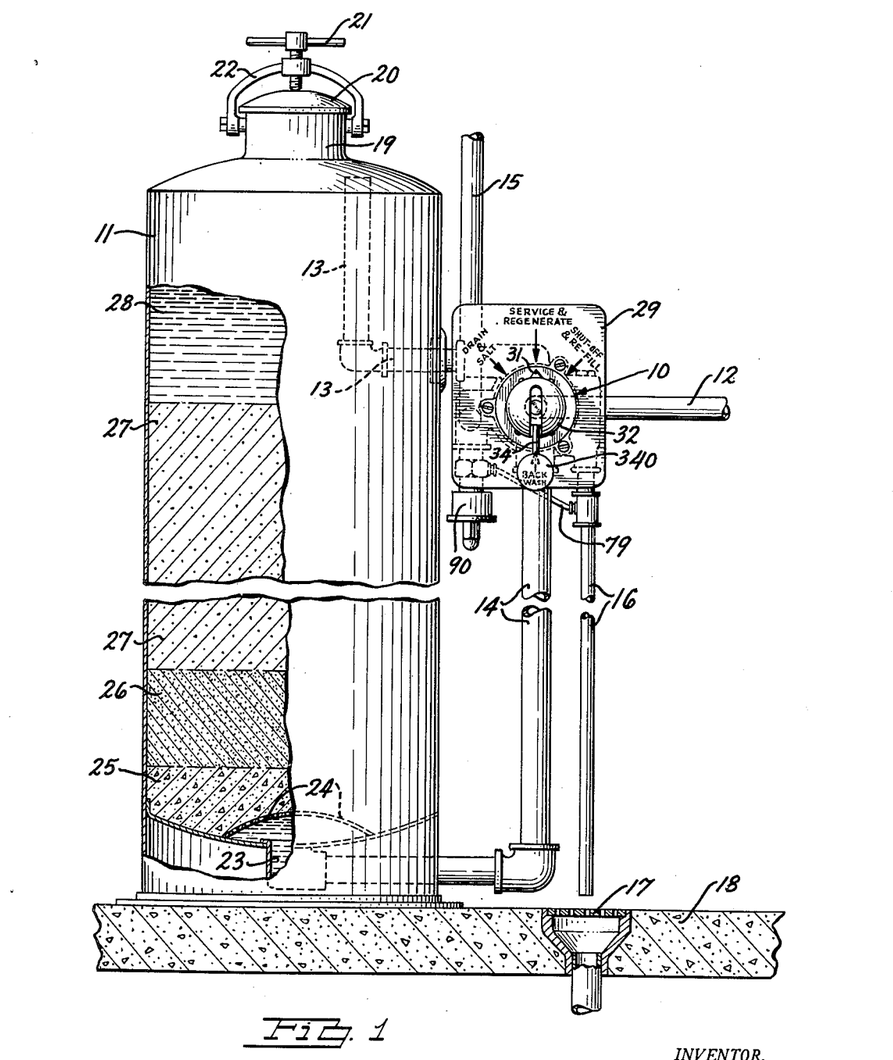
Fig. 1 is a front elevational view of a water softener control valve embodying the invention connected to a water supply and a water softener, and with a drain line therefrom to a drain.
Figure 2:
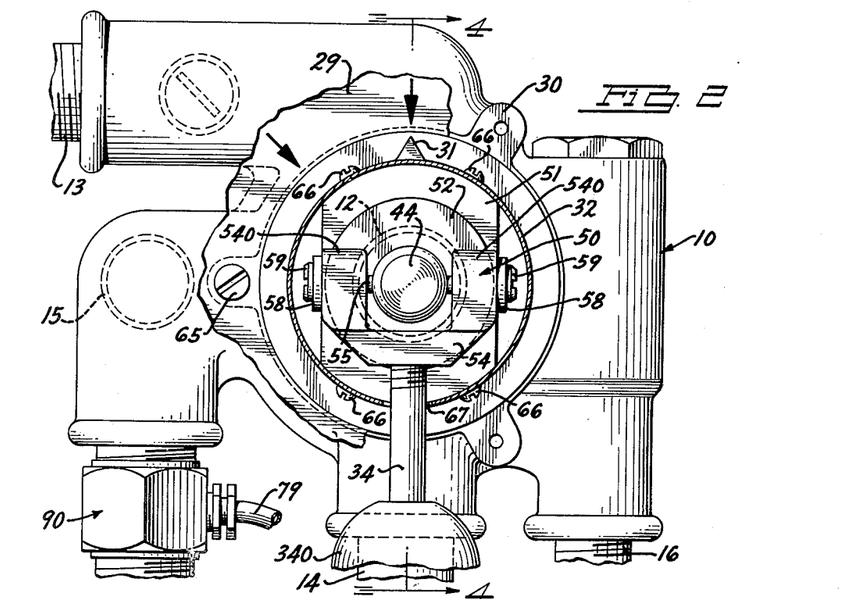
Fig. 2 is an enlarged front elevational view of the water softener control valve disclosed in Fig. 1 with a portion of the control lever housing broken away to show the valve operating lever construction more clearly.
Figure 3:
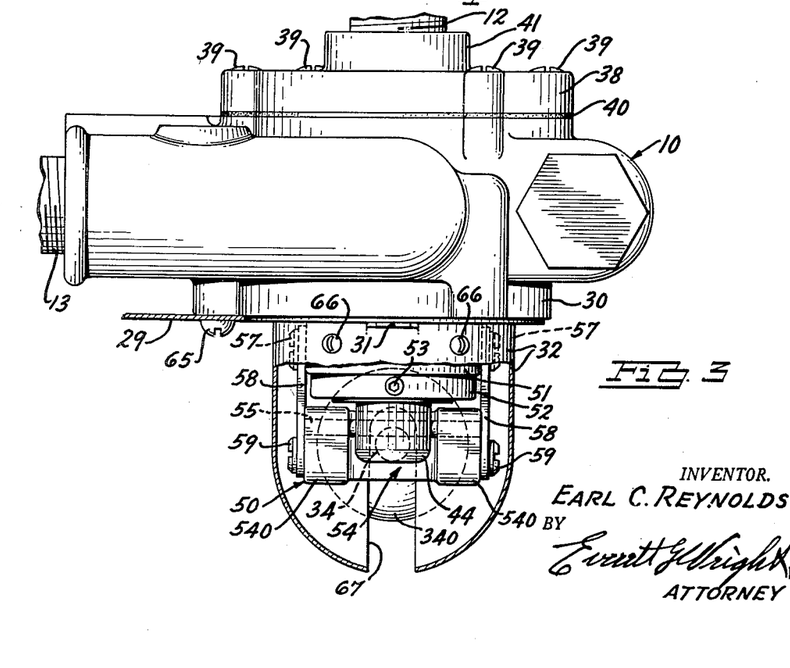
Fig. 3 is a top plan view of the water softener control valve disclosed in Figs. 1 and 2 with a portion of the control lever housing broken away to show the valve operating lever construction more clearly.

Referring now to the drawings wherein like numerals refer to like and corresponding parts throughout the several views, the particular embodiment of a semi-automatic control valve 10 disclosed to illustrate the invention is shown connected in operating relationship to the tank 11 of a zeolite crystal type water softener to which hard water is supplied during the normal water softening cycle of operation of the water softener from a hard water supply line 12 through the control valve 10 and the hard water inlet 13 preferably extending to near the inner top of the water softener tank 11. From the bottom of the water softener tank 11 soft water is supplied to a soft water service line 15 through a soft water outlet 14 and the control valve 10. A drain 16 runs from the control valve 10 to a sump 17 generally located in a basement floor 18.

The water softener tank 11 may be of any suitable construction preferably having an open neck 19 normally closed by a cap 20 removably secured in sealed position by a hand screw 21 threaded through a suitable bail 22 pivotally connected to the neck 19 of the said water softener tank 11. The water softener tank 11 has a screen 24 above the sump 23 at the bottom thereof and is preferably filled with a relatively thin layer of gravel 25, a relatively thin sand filter bed 26, a deep layer of water softening crystals or minerals 27, and hard water 28, which, during the normal water softening cycle of operation of the water softener when in "Service," passes through the water softening crystals 27 and becomes softened, then continues through the filter bed 26, the gravel 15, and the screen 24 to the sump 23 to which the soft water outlet 14 is connected.

In the water softener, the water softening crystals 27 gradually lose their water softening properties and effectiveness due to their retention of and becoming coated with hard minerals and other matter removed from the hard water as it passes therethrough to become softened. To restore the water softening properties of the water softening crystals, they have to be cleaned or washed and then regenerated by means of passing a brine solution thereover. Likewise, the "filter bed" composed of gravel 25 and sand 26, which is not actually a filter bed but a sustaining bed for the water softening crystals 27, becomes filled with foreign matter and must be cleaned or washed.

The illustrative embodiment of the semi-automatic water softener control valve 10 embodying the invention has four operating positions, namely, Service & Regenerate, Back-Wash, Drain & Salt and Shut-Off & Re-Fill, all as indicated on the dial plate 29 mounted on the valve body 30. A pointer 31 on the housing 32 over the valve control lever mechanism turnable with the axially movable frusto-conical rotary selector valve element 33 responsive to manipulation of the valve control lever 34 shows the operating position of the selective water softener control valve 10 at all times.

The valve body (Fig. 4) 30 is preferably formed of cast brass or the like with a tapered cylindrical or frusto-conical valve chamber 35 therein, has an axially central boss 36 formed integral with and extending forwardly from the front side 37 thereof, and is provided with a rear cover plate 38 fixed to the said valve body 30 by suitable studs 39. A gasket 40 disposed between the rear cover plate 37 and the valve body 30 assures a fluid tight seal therebetween. A boss 41 on the rear cover plate 38 is disposed axially with respect to the valve chamber 35 and is axially bored and threaded to provide a hard water supply port 120 to which hard water is supplied from the hard water supply line 12 threaded thereinto. The axially central boss 36 on the front side 37 of the valve body 30 is axially bored at 42 to accommodate the mounting of the axially movable rotary selector valve element 33.

Figure 4:
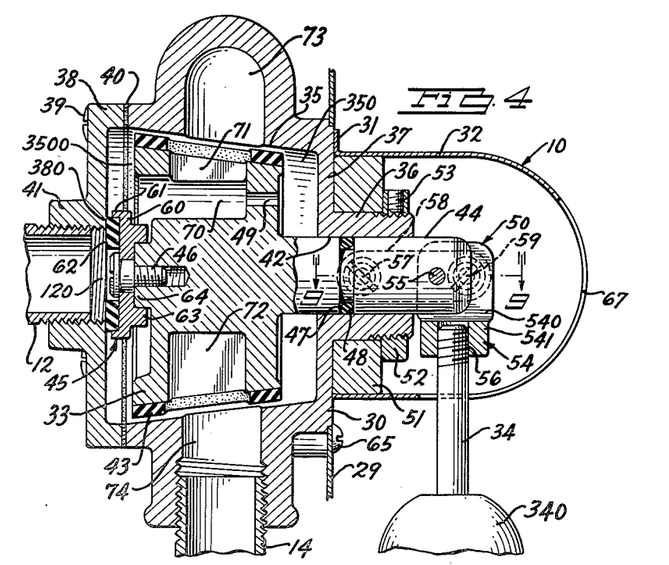
Fig. 4 is a vertical sectional view of the water softener control valve taken on the line 4—4 of Fig. 2 looking in the direction indicated by the arrows showing the valve operating lever in its normal or straight-out position, the axial valve element thereof seated, and the frusto-conical rotary selector element thereof unseated.

The said axially movable rotary selector valve element 33 is frusto-conical in shape, is provided with a plurality of ports and passages as hereinafter described in detail, is preferably provided with a neoprene or other molded rubber or artificial rubber conical facing 43 to assure fluid tight seating against the tapered side of the valve chamber 35 when moved forwardly in the said valve chamber 35, is provided with a forwardly extending axially disposed mounting stem 44 journaled in the axial bore 42 in the central boss 36 on the front side 37 of the valve body 30 in axially movable relationship thereto, and is provided with a rearwardly facing poppet type valve element 45 journaled on a shouldered stud 46 threaded centrally in the rear end of the valve element 33 closing the hard water supply port 120 in the rear cover plate 38 of the valve body 30 when the rotary selector valve element 33 is moved axially rearward. A circumferential groove 47 is provided in the mounting stem 44 of the axially movable rotary selector valve element 33 into which an O-ring 48 is positioned whereby to provide a fluid seal between the said mounting stem 44 of the rotary selector valve element 33 and the central boss 36 of the valve body 30 and at the same time permit both rotation and axial movement of the said axially movable rotary selector valve element 33 in the valve chamber 35.

Figure 5:
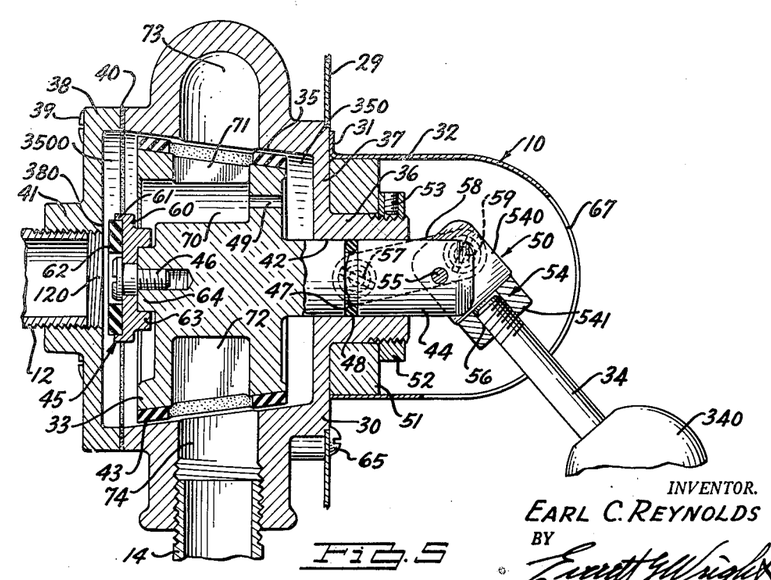
Fig. 5 is a vertical sectional view similar to Fig. 4 except that the valve operating lever is shown in a bleed position which is part way between its turn or select position and its normal or straight-out position with both the axial valve element and the frusto-conical rotary selector element unseated.

In its normal Service & Regenerate position, the axially movable frusto-conical rotary selector valve element 33 has been turned by the valve control lever 34 to the position shown in Figs. 1 and 4, the valve control lever 34 was then lifted to its position shown in Fig. 5 which moves the said selector valve element 33 forward in the valve chamber 35 and unseats the rearwardly facing valve element 45 thus admitting hard water under pressure to the valve chamber 35 through the hard water supply port 120 from the hard water supply source 12. The hard water pressure against the large end of the axially movable frusto-conical rotary selector valve element 33 moves the said valve element 33 axially forward into a pressure sealed seated relationship against the tapered side of the valve chamber 35 as shown in Fig. 6 with the operating lever 34 disposed in its straight-out normal position.

Figure 6:
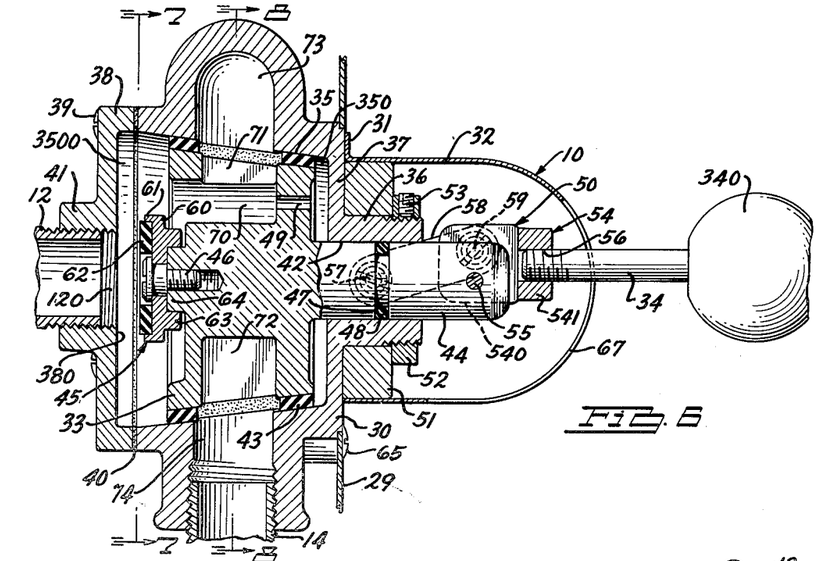
Fig. 6 is a vertical sectional view similar to Figs. 4 and 5 except that the valve operating lever is shown in its normal or straight-out position with the axial valve element unseated, and the frusto-conical rotary selector element seated.
Figure 7:
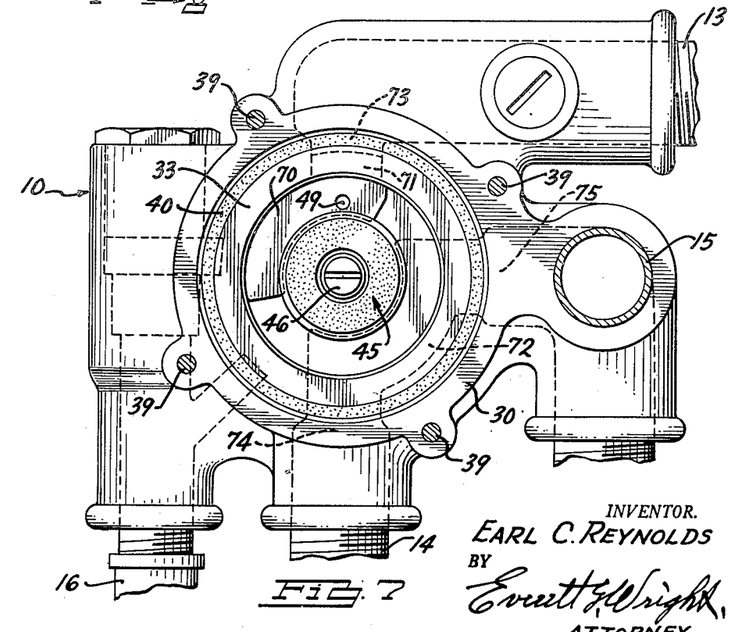
Fig. 7 is a vertical sectional view taken on the line 7—7 of Fig. 6.

To move the axially movable frusto-conical rotary valve element 33 from any operating position to any other operating position, the operating lever 34 is first moved from its straight-out normal position as shown in Fig. 6 to its turn position at substantially right angles to the mounting stem 44 of the said frusto-conical rotary valve element 33 as shown in Fig. 4, and, after the said valve element 33 is turned to the desired operating position with the indicator 31 pointing at the selected arrow on the dial plate 31, the operating lever is moved at least part way as shown in Fig. 5 toward its straight-out normal position shown in Fig. 6, whereupon hard water under pressure from the hard water supply source 12 will seat the frusto-conical rotary selector valve element 33 in pressure sealed relationship in the tapered cylindrical valve chamber 35. A small communicating aperture 49 through the valve element 33 prevents entrapment of water in the valve chamber 35 at the front end 35C thereof, thus eliminating any hydraulic interference to the pressure sealing of the valve element 33 in seated relationship against the tapered side of the valve chamber 35.

To accomplish the selective turning of the frusto-conical rotary selector valve element 33, the manual unseating of the said valve element 33 in respect to the tapered side of the valve chamber 35, the manual shutting-off of the hard water supply 12 during the selective movement of the selector valve element 33 is accomplished by seating the rearwardly facing valve element 45 carried by the rotary selector valve element 33 against the rear cover plate 38 of the valve body 30 over the hard water supply port 120, and to otherwise operate a semi-automatic water softener control valve embodying the invention, valve control toggle mechanism generally designated in the drawings by the numeral 50 is preferably employed, which mechanism is under manual control of the valve control lever 34 and under hydraulic control responsive to hard water pressure against the rear of the axially movable frusto-conical rotary selector valve element 33.

The said valve control toggle mechanism 50 comprises a thrust ring 51 journaled around the said axially central boss 36 formed integral with and extending forwardly from the front side 37 of the valve body 30 which is maintained in place by an anchor ring 52 threaded on the outer end of the said boss 36 and fixed by a set screw 53 in a position to prevent axial movement and permit free rotary movement of the thrust ring 51 with respect to the valve body 30. A yoke 54 is pivoted to the mounting stem 44 of the valve element 33 near the end thereof by a pivot pin 55 disposed centrally through the said mounting stem 44 of the valve element 33 and extending eccentrically into the bifurcated ends 540 of the said yoke 54, see Figs. 4, 5, 6 and 9. The transverse portion 541 of the yoke 54 is centrally threaded at 56 to receive the valve control lever 34 which preferably is provided with a hand knob or grip 340 on the outer end thereof. The sides of the slip ring 51 are preferably flattened to align with the outer sides of the bifurcated ends 540 of the yoke 54 and to receive suitable shouldered studs 57 by means of which one end of a pair of links 58 are pivotally connected to the said slip ring 51. The other ends of the said links 58 are pivotally connected by shouldered studs 59 to outer sides of the bifurcated ends 540 of the yoke 54 in alignment with and forwardly in respect to the pivot pin 55 connecting the yoke 54 to the mounting stem 44 of the valve element 33 when the operating lever is turned downwardly at right angles to the mounting stem 44 about the pivot pin 55, see Figs. 4 and 9. The relative location of the pivot pin 55, the pivot points 57 and 59 at both ends of the links 58, and the eccentricity of the yoke 54 with respect to the pivot pin 55 cause the axially movable frusto-conical rotary selector valve element 33 to be fully open in respect to the tapered cylindrical valve chamber 35 while the rearwardly facing valve element 45 thereof closes the hard water supply port 120, see Fig. 4. It is in this position that the selector valve element 33 is rotated from one selected position to another. Fig. 5 shows rotary selector valve element open both with respect to the tapered cylindrical valve chamber 35 and the hard water supply port 120. Fig. 6 shows the rotary selector valve element pressure sealed in one of its selected positions with respect to the tapered cylindrical valve chamber 35 with the hard water supply port 120 fully open. Inasmuch as there is a plurality of ports around the periphery of the tapered cylindrical valve chamber 35 and a single axial port at the rear thereof, all controlled by a toggle lever operated axially movable rotary selector valve element 33 and the rearwardly facing poppet type valve element 45 journaled on the rear thereof, the particular embodiment of the water softener control valve herein described is termed an integral rotary multi-port and axial single port toggle operated water softener control valve.

The said poppet type valve element 45 moves onto and off from its seat 380 which is at the inside of the rear cover plate 38 of the valve body 30 surrounding the hard water supply port 120, and comprises a metal cup shaped disc 60 having a rearwardly extending peripheral flange 61 which contains an annular somewhat resilient valve facing 62 employed to provide a fluid tight seal between the seat 380 and the poppet type valve element 45. The bottom of the said metal cup shaped disc 60 is provided with an annular forwardly extending flange 63 which extends over a cylindrical mounting boss 64 formed in the rear end of the valve element 33. The said poppet type valve element 45 is journaled onto the said cylindrical mounting boss 64 in the rear end of the valve element 33 by means of a shouldered stud 46 threaded into the center of the said boss 64 at the rear end of the valve element 33. When the valve control lever 34 is in the position shown in Fig. 4, the frusto-conical rotary selector valve element 33 is unseated in respect to the tapered side of the cylindrical valve chamber 35 and the poppet type valve element 45 is positioned in sealed relationship on its seat 380 closing the hard water supply port 120.

The frusto-conical rotary selector valve element 33 may be turned to any desired position while the control lever 34 is positioned as shown in Fig. 4 while the poppet type valve element 45 remains fixed in respect to its seat 380, thus avoiding flow of hard water through the control valve 10 during selective rotary movement of the frusto-conical selector valve element 33, the preferred construction of the poppet type valve element 45 avoiding frictional wear of the valve facing 62 of the said poppet type valve element 45. The several desired positions to which the frusto-conical rotary selector valve element 33 is preferably turned in the embodiment of the invention disclosed herein are indicated by heavy black arrows on the dial plate 29 mounted by studs 65 on the valve body 30. The pointer 31 on the housing 32 disposed over the valve control toggle mechanism 50 is pointed to the Service & Regenerate arrow on the dial plate 29 throughout the drawings for the purpose of describing the invention, Figs. 4, 5 and 6 indicating several different swingable positions of the control lever 34 showing axial movement of the axially movable rotary selector valve element 33 and its poppet valve element 45. The control lever 34 may, of course, be swung to any of its swingable positions when turned to any other position than Service & Regenerate. The said housing 32 disposed over the valve control toggle mechanism is fixed to the thrust ring 51 by means of studs 66 whereby to cause the said housing 32 and the pointer 31 thereon to rotate with the axially movable frusto-conical selector valve element 33, and, the said housing 32 has a suitable slot 67 therein through which the control lever 34 extends.

Figures 8, 9:
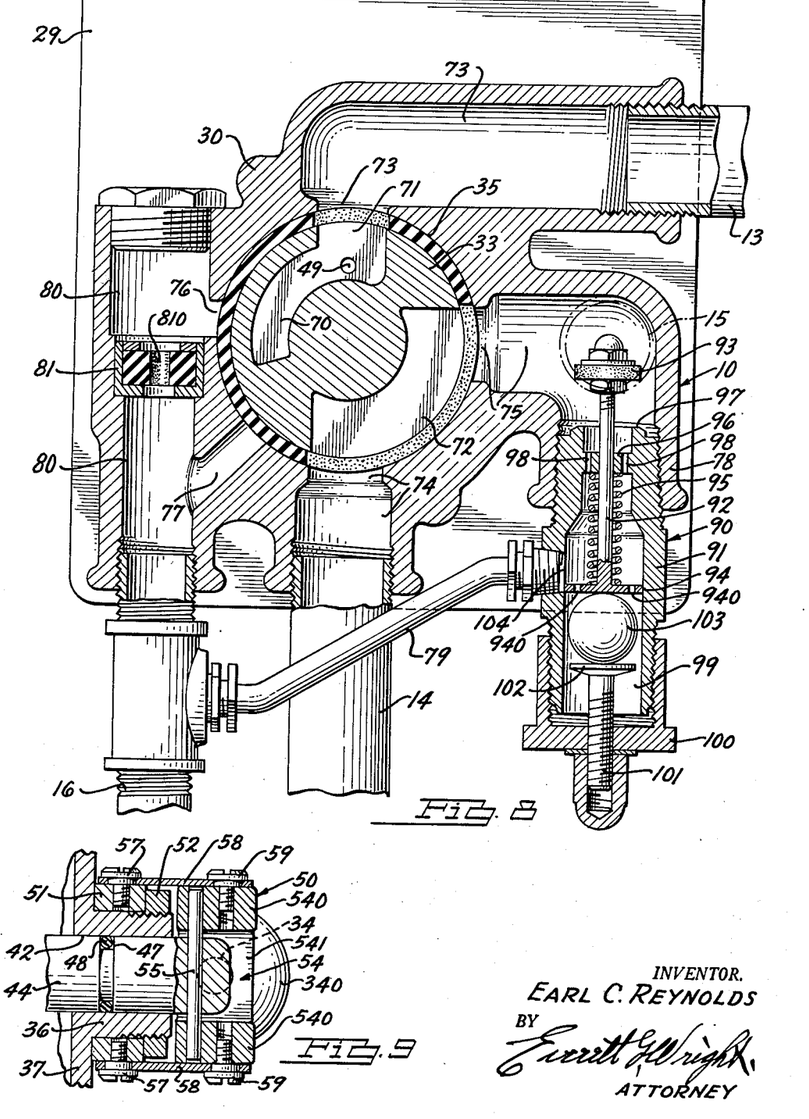
Fig. 8 is a vertical sectional view taken on the line 8—8 of Fig. 6.
Fig. 9 is a fragmentary horizontal sectional view taken on the line 9—9 of Fig. 4.

The axially movable frusto-conical rotary selector valve element 33 is provided with a rearwardly facing arcuate fluid passage 70 communicating at any position of the rotary selector valve element 33 with the rear end 3500 of the valve chamber 35. The small communicating aperture 49 through the valve element 33 for the purpose of preventing entrapment of water in the front end 350 of the valve chamber 35 may be located at the front wall of the fluid chamber 70. A radially disposed port 71 extends from the fluid chamber 70 through the side of the axially movable frusto-conical selector valve element 33. The said axially movable frusto-conical selector valve element 33 is also provided with an arcuate radially disposed fluid passage 72 of sufficient length to communicate with more than one of the several radially disposed ports 73, 74, 75, 76 and 77 in the valve housing 32 opening into the tapered side of the tapered cylindrical valve chamber 35 from a plurality of directions as best shown in Fig. 8. The said radially disposed port 71 and the circumferentially disposed fluid passage 72 of the axially movable rotary selector valve element 33 are so located with respect to the radially disposed ports 73, 74, 75, 76 and 77 in the valve housing 32 as to register therewith when turned opposite any of them and when the said axially movable rotary selector valve element 33 is moved either manually or hydraulically forward into seated and sealed relationship with respect to the tapered side of the cylindrical valve chamber 35; thus selected fluid tight passages are provided through the control valve 10.

As before stated hard water is supplied to a water softener through the water softener control valve 10, the hard water entering the said control valve 10 from a hard water supply line 12 and the hard water supply port 120. This occurs when the control valve 10 is in its normal operating position with the valve control lever 33 turned so that the pointer 31 points to Service, and when the axially movable frusto-conical rotary selector valve element 33 is hydraulically seated against the tapered side of the cylindrical valve chamber 35 as shown in Fig. 6 by the pressure of hard water in the rear end 3500 of the valve chamber 35 acting against the rear of said axially movable frusto-conical rotary selector valve element 33. When the said valve element 33 is moved axially forward into a sealed seated relationship against the tapered side of the cylindrical valve chamber 35, the valve control lever 34 is in its normal straight-out position. Obviously, the moving of the valve control lever 34 manually to its normal straight-out position also moves the frusto-conical valve element axially forward into a sealed seated relationship against the tapered side of the cylindrical valve chamber 35.

When the water softener is in its Service cycle of operation, hard water that enters the water softened control valve 10 from the hard water supply line 12 and the hard water supply port 120 passes through the rear end 3500 of the valve chamber 35 into the arcuate fluid passage 70 and through the radially disposed port 71 of the axially movable frusto-conical rotary selector valve element 33, and out the hard water inlet port 73 in the valve housing 32 through the hard water inlet line 13 which runs to a suitable point within the top of the water softener tank 11. The water in the tank becomes softened by virtue of passing through the water softener crystals 27, and, the soft water leaves the bottom of the water softener tank 11 through a soft water outlet line 14 which is connected to the soft water inlet port 74 of the valve housing 32 through which soft water enters the circumferentially disposed fluid passage 72 of the axially movable frusto-conical rotary selector valve element 33 and passes therethrough to the soft water service port 75 to the soft water service line 15. When the water softener is in its Service cycle of operation, the soluble ball regeneration cycle timing valve 90 is closed, the soluble timing ball 103 indicated in Fig. 8 which normally holds the regeneration cycle timing valve 90 open having dissolved previously and the spring loaded disc valve 93 thereof having seated itself on its annular seat 97.

After the water softening crystals 27 have become ineffective due to deposits of mineral particles thereon from hard water during the Service cycle of operation of the water softener, it becomes necessary to recondition the water softener to restore it to normal operating efficiency. This is often termed "the regeneration" of the water softener; however, the reconditioning of the water softener to normal operating efficiency requires the following steps: (1) Back-Wash, (2) Drain & Salt, (3) Re-Fill, and (4) Regenerate. The water softener is removed from Service and carried through the foregoing steps by manual operation of the semi-automatic control valve 10, and then, the regeneration cycle timing valve 90 automatically transfers the water softener from its Regeneration cycle of operation to its Service cycle of operation. The soluble ball type regeneration cycle timing valve 90 shown in the drawings is not a part of this invention, but is a preferred element employed as a component of the semi-automatic water softener control valve 10 embodying the invention herein disclosed and claimed. The said soluble ball type regeneration cycle timing valve 90 is fully disclosed in U. S. Letters Patent No. 1,964,302, and while shown as an element of this invention, it is obvious that other types of timing valves may be employed to time the Regeneration cycle of operation of a water softener employing a water softener control valve 10, or manual transfer from the Regeneration to Service cycles of operation of the water softener may be employed.

The preferable form of soluble ball regeneration cycle timing valve 90 employed in connection with the semi-automatic water softener control valve 10 for water softening systems embodying the invention is shown in detail in Fig. 8 and comprises a hollow body member 91 threaded into a timer valve bore 78 in the body 30 of the control valve 10 which communicates with the soft water service port 75 thereof which also communicates with the soft water service line 15. The said regeneration cycle timing valve hollow body member 91 is suitably bored and counterbored to accommodate a valve stem 92 having a disc valve 93 fixed at the top thereof and a flange 94 fixed on the bottom thereof, the said flange 94 having a plurality of apertures 940 therethrough. A compression spring 95 disposed around the valve stem 92 abutting against a partition 96 within the hollow body member 91 reacts against the top of the flange 94 fixed at the bottom of the valve stem 92 and constantly urges the disc valve 93 toward and in sealed relationship against the annular seat 97 formed on the top of the body member 91. The said partition 96 of the body member 91 is so bored as to provide passages 98 around the valve stem 92 whereby to permit water to flow into a lower ball chamber 99 formed in the said body member 91 through the apertures 940 in the flange 94 on the bottom of the valve stem 92. The bottom of the body member 91 of the soluble ball timing valve 90 is provided with a cap 100 threaded thereon. The said cap 100 has a vertically adjustable pin 101 threaded centrally therethrough, which pin 101 has a flat soluble ball engaging disc 102 on the top thereof which opposes the flange 94 fixed on the bottom of the valve stem 92. When a soluble timing ball 103 is placed in the ball chamber 99 of the soluble ball timing valve 90, and the cap 100 is threaded thereon, the soluble ball 103 is pressed by the disc 102 carried by the pin 101 in the cap 100 against the flange 94 fixed on the bottom of the valve stem 92 and unseats or opens the disc valve 93. The disc valve 93 remains open as shown in Fig. 8 until the soluble ball 103 dissolves as the result of water passing therearound whereby the disc valve 93 closes on its annular seat 97 formed on the top of the body member 91. The distance to which the pin 101 and the flat disc 102 extend below the inside of the top of the cap 100 of the timing valve 90 may be adjusted to accommodate any size of soluble ball 103 and to allow the valve 93 to close at the rate at which the selected soluble ball 103 may be dissolved. Thus, the length of time the timing valve 90 remains open after a soluble ball 103 is inserted in the timing valve 90 which governs the duration of the Regeneration cycle of operation of a water softener employing a semi-automatic control valve 10 embodying the invention may be regulated with ease by selecting a soluble ball 103 of the proper size and rate of solubility. The said timing valve 90 has a port 104 in the side thereof through which water passing from the timer valve bore 78 of the semi-automatic control valve 10 through the timing valve 90 may pass to the drain line 16 and sump 17 via a copper tubing 79 connected therebetween.

To accomplish the Back-Wash cycle of operation of a water softener employing a semi-automatic control valve 10 from the Service cycle of operation thereof, the valve control lever 34 is swung first from its normal or straight-out position to its down or turn position. This unseats the axially movable frusto-conical rotary selector valve element 45 in respect to the tapered side of the valve chamber 35 and causes the poppet valve element 45 thereof to shut off the hard water supply entering the control valve 10 through the hard water supply port 120. The valve control lever 34 is then turned until the pointer 31 registers with the black arrow on the dial plate 29 marked Back-Wash. The valve control lever 34 is then swung back to its normal or straight-out position which causes the poppet valve element 45 to unseat and open the hard water supply entering the semi-automatic water softener control valve 10 through the hard water supply port 120 and causes the frusto-conical rotary selector valve element 33 of the said control valve 10 to seat. The said rotary selector valve element 33 is maintained seated by hard water pressure against the rear end thereof built up in the rear end 3500 of the valve chamber 35. In the Back-Wash position of the said control valve 10, hard water entering the rear end 3500 of the valve chamber 35 enters the arcuate fluid passage 70 of the axially movable frusto-conical rotary selector valve element 33 and passes through the radially disposed port 71 thereof to and through the soft water inlet port 74 of the valve housing 32, through the soft water outlet line 14 to the bottom of the water softener tank 11, through the water softening crystals 27 and the water softener tank 11 and out the hard water inlet line 13 thereto, through the hard water inlet line 13 to and through the hard water inlet port 73 in the valve housing 32 and into the circumferentially disposed fluid passage 72 of the axially movable frusto-conical rotary selector valve element 33. From the said circumferentially disposed fluid passage 72 of the rotary selector valve element 33, wash water passes through a drain port 76 in the valve housing 32, to a drain chamber 80 in the said housing 32, through an orifice type flow control valve 81 disposed in the said drain chamber 80, out the drain chamber 80 to and through a drain line 16 running from the said semi-automatic control valve 10 to a suitable sump 17. Thus, it is observed that when the semi-automatic control valve 10 is in its Back-Wash position, hard water from the hard water supply line 12 is directed in a reverse direction through the water softener tank 11 and the water softening crystals 27 to the sump 17 whereby to wash foreign deposits from the gravel bed 25, sand filter bed 26, water softening crystals 27 and the water softening tank 11. The wash water to the sump 17 will first be cloudy, and, as soon as it is observed to run clear, the Back-Wash cycle of operation of the water softener has been completed. The size of the orifice 810 in the orifice type flow control valve 81 determines the rate of flow of wash water through the water softener tank 11 and the water softening crystals 27.

After the Back-Wash cycle of operation has been completed, it is next necessary to Drain & Salt the water softener tank 11.

To accomplish the Drain & Salt cycle of operation of a water softener employing a semi-automatic control valve 10 embodying the invention from the Back-Wash cycle of operation thereof, the valve control lever 34 is swung first from its normal or straight out position to its down or turn position. This unseats the axially movable frusto-conical selector valve element 33 in respect to the tapered side of the valve chamber 35 and causes the poppet valve element 45 thereof to shut off the hard water supply entering the control valve 10 through the hard water supply port 120. The valve control lever 34 is then turned until the pointer 31 registers with the black arrow on the dial plate 29 marked Drain & Salt. The valve control lever 34 is then swung back to its normal or straight-out position which causes the poppet valve element 45 to unseat and open the hard water supply entering the semi-automatic water softener control valve 10 through the hard water supply port 120 and causes the frusto-conical rotary selector valve element 33 of the said control valve 10 to seat. The said rotary selector valve element 33 is maintained seated by hard water pressure against the rear end thereof built up in the rear end 3500 of the valve chamber 35. In the Drain & Salt position of the said control valve 10, hard water entering the rear end 3500 of the valve chamber 35 enters the arcuate fluid passage 70 of the axially movable frusto-conical rotary selector valve element 33 and the radially disposed port 71 thereof, but goes no further inasmuch as the said port 71 of the said axially movable frusto-conical rotary selector valve element 33 is closed by the complementarily tapered side of the valve chamber 35. The hand screw 21 through the bail 22 of the water softener tank 11 is unscrewed, and the cap 20 thereof is removed. This permits water in the water softener tank 11 to drain out the bottom thereof through the soft water outlet line 14 connected to the soft water inlet port 74 of the valve housing 32 through which the drain water enters the circumferentially disposed fluid passage 72 of the axially movable frusto-conical rotary selector valve element 33 and passes therethrough to and through the drain port 77 to the drain chamber 80 in the housing 32 from whence it passes into and through the drain line 16 to the sump 17. As soon as the water softener tank 11 has been drained down to a level sufficient to permit the water softener tank 11 to accommodate the required amount of salt to regenerate the water softening crystals 27, salt is placed in the top of the water softener tank 11 through the open neck 19 thereof. If a soluble ball timing valve 90 is employed in connection with the control valve 10, the timing valve cap 100 is removed from the body 91 of the soluble ball timing valve 90, a suitable soluble ball 103 is placed in timing ball chamber 99 of the said soluble ball timing valve 90, and the timing valve cap 100 is then threaded to its normal position onto the body member 91 thereof.

After the Drain & Salt cycle of operation has been accomplished, it is next necessary to Re-Fill the water softener tank 11.

To accomplish the Re-Fill cycle of operation of a water softener employing a semi-automatic control valve 10 embodying the invention from the Drain & Salt cycle of operation thereof, the valve control lever 34 is swung first from its normal or straight-out position to its down or turn position. This unseats the axially movable frusto-conical selector valve element 33 in respect to the tapered side of the valve chamber 35 and causes the poppet valve element 45 thereof to shut off the hard water supply entering the control valve 10 through the hard water supply port 120. The valve control lever 34 is then turned until the pointer 31 registers with the black arrow on the dial plate 29 marked Shut-Off & Re-Fill. The valve control lever 34 is then swung back to its normal or straight-out position which causes the poppet valve element 45 to unseat and open the hard water supply port 120 of the semi-automatic water softener control valve 10 and permits hard water to enter the rear end 3500 of the valve chamber 35 through the hard water supply port 120 and causes the frusto-conical rotary selector valve element 33 of the said control valve 10 to seat. The said rotary selector valve element 33 is maintained seated by hard water pressure against the rear end thereof built up in the rear end 3500 of the valve chamber 35. In the Shut-Off & Re-Fill position of the said control valve 10, hard water entering the rear end 3500 of the valve chamber 35 enters the arcuate fluid passage 70 of the axially movable frusto-conical rotary selector valve element 33 and the radially disposed port 71 thereof, but goes no further while the valve control lever 34 is in its normal or straight-out position inasmuch as the said port 71 of the said axially movable frusto-conical rotary valve element is closed by the complementarily tapered side of the valve chamber 35. The ports 73, 74, 75, 76 and 77 in the valve housing 32 are all closed by the axially movable frusto-conical rotary selector valve element 33 when the control lever 34 is turned so that the pointer 31 registers with the black arrow on the dial plate 29 marked Shut-Off & Re-Fill and the control lever 34 is in its normal or straight-out position. To refill the water softener tank 11, the control lever 34 is moved manually to half way between its normal or straight-out position and its turn position whereupon the axially movable frusto-conical rotary valve element 33 and the poppet valve element 45 thereof are unseated and all ports 120, 71, 72, 73, 74, 75 and 76 are cracked open as indicated in Fig. 5 except that the control lever 34 and the axially movable frusto-conical rotary valve element 33 have been turned to their Shut-Off & Re-Fill position. This permits hard water entering the valve chamber 35 to fill the water softener tank 11 through the hard water inlet port 73 in the valve housing 32 and through the hard water inlet line 13, a small amount of water bleeding from the valve chamber 35 from the soft water service port 75 through the timing valve 90 and tubing 79 to the drain line 16 and from the drain ports 76 and 77 through the drain chamber 80 to the drain line 16, and thence from the said drain line 16 into the sump 17. As soon as the water softener tank 11 has been refilled, the control lever 34 is returned to its normal or straight-out position, the cap 20 is then replaced over the open neck 19 of the water softener tank 11 and is secured in sealed relationship over the said open neck 19 by the hand screw 21 threaded through the bail 22 thereof, and the Re-Fill cycle of operation of the water softener is completed.

After the Re-Fill cycle of operation has been accomplished, it is next necessary to Regenerate the water soften crystals 27 in the water softener tank 11 and return the water softener to its Service cycle of operation.

To accomplish the Regeneration cycle of operation of a water softener employing a semi-automatic control valve 10 embodying the invention from the Re-Fill cycle of operation thereof, the valve control lever 34 is swung first from its normal or straight-out position to its down or turn position. This unseats the axially movable frusto-conical selector valve element 33 in respect to the tapered side of the valve chamber 35 and causes the poppet valve element 45 thereof to shut off the hard water supply entering the control valve 10 through the hard water supply port 120. The valve control lever 34 is then turned until the pointer 31 registers with the black arrow on the dial plate 29 marked Service & Regenerate. The valve control lever 34 is then swung back to its normal or straight-out position which causes the poppet valve element 45 to unseat and open the hard water supply port 120 of the semi-automatic water softener valve 10 and permits hard water to enter the rear end 3500 of the valve chamber 35 through the hard water supply port and causes the frusto-conical rotary selector valve element 33 of the said control valve to seat. The said frusto-conical rotary selector valve element 33 is maintained seated by hard water pressure against the rear end thereof built up in the rear end of the valve chamber 35. Inasmuch as the soluble timing ball 103 of the soluble ball regeneration cycle timing valve 90 is holding the disc valve 93 thereof open as illustrated in Fig. 8, the semi-automatic water softener control valve will cause the water softening crystals 27 in the water softener tank 11 to become regenerated by the passage of water through the water softener tank 11 which is turned to brine as the water passes through the salt previously placed in the top of the water softener tank 11 above the water softening crystals 27 therein. This is the Regeneration cycle of operation of the water softener during which hard water that enters the water softener control valve 10 from the hard water supply line 12 and the hard water supply port 120 passes through the rear end 3500 of the valve chamber 35 into the arcuate fluid passage 70 and through the radially disposed port 71 of the axially movable frusto-conical rotary selector valve element 33, and out the hard water inlet port 73 in the valve housing 32 through the hard water inlet line 13 which runs to a suitable point within the top of the water softener tank 11. The water in top of the water softener tank 11 then turns to brine from the salt previously deposited in the top thereof as the brine passes through the water softening crystals 27 to regenerate them. The said brine then passes through the sand filter bed 26, through the gravel bed 25 and out the bottom of the water softener tank 11 through the soft water outlet line 14 which is connected to the soft water inlet port 74 of the valve housing 32 through which the brine enters the circumferentially disposed fluid passage 72 of the axially movable frusto-conical rotary selector valve element 33 and passes therethrough to and through the soluble ball regeneration cycle valve 90 and out the tubing connection 79 to the drain line 16 to the sump 17. A small circulation of brine is created in the lower ball chamber 99 of the soluble ball regeneration cycle timing valve 90 as brine passes therethrough causing the soluble ball 103 to dissolve which permits the spring loaded disc valve 93 of the said soluble ball regeneration cycle timing valve 90 to close whereupon the Renegeration cycle of operation of the semi-automatic water softener control valve has been completed, and the water softener automatically returns to its Service cycle of operation as hereinbefore described in detail. In an average installation, the Regeneration cycle of operation of a water softener takes approximately one hour, and, the soluble ball 103 is of such size and composition to take approximately that length of time to dissolve completely. In any event, the Regeneration cycle of operation of a water softener controlled by a semi-automatic water softener control valve embodying the invention should be sufficiently long to dissolve all of the salt placed in the top of the water softener tank plus a sufficient time to thoroughly flush out from the water softener tank any and all brine formed through the dissolving of the salt.

Obviously, if semi-automatic operation of the semi-automatic water softener control valve 10 is not required or desired, a manual valve may be employed rather than a timing valve 90 to switch over from the Regeneration cycle of operation of a water softener to the Service cycle of operation thereof. Also, it is obvious that a mechanical or electrical timing valve may be substituted for the soluble ball regeneration cycle timing valve 90 if desired.

Although but a single embodiment of the invention has been disclosed and described in detail, it is obvious that many changes may be made in the size, shape, arrangement and detail of the various elements thereof without departing from the spirit and scope thereof as defined by the appended claims.

I claim:

1. In a water softener control valve, a housing having a tapered cylindrical valve chamber therein and a plurality of ports therethrough opening into the tapered sides of the said valve chamber and a central axially disposed port through one end thereof opening into the larger end of the said valve chamber through which water under pressure is constantly available to the said valve chamber, a frusto-conical selector valve element seatable on the tapered sides of the said valve chamber in sealed relationship thereto over the said ports therein having a fluid passage therethrough between the larger end thereof and the tapered side thereof and an arcuate fluid passage therein along a portion of the periphery thereof alignable with ports in the said valve housing when the said selector valve element is seated on the tapered sides of the said valve chamber, a poppet valve element journaled centrally on the said frusto-conical valve element seatable against the larger end of the said valve chamber in sealed relationship over the said central axially disposed port therein, a mounting stem on the said frusto-conical selector valve element rotatably and axially slidably mounted through the smaller end of the said housing, and a single manual control means for turning the said frusto-conical valve element to selected positions with respect to the ports in the tapered sides of the valve chamber and axially moving the said frusto-conical valve element into and out of seated relationship with respect to the tapered sides of the said valve chamber and axially moving the poppet valve element thereof out of and into seated relationship with respect to the larger end of the said valve chamber.

2. In a water softener control valve of the type including a housing having a tapered cylindrical valve chamber therein and a plurality of ports therethrough opening into the tapered sides of the said valve chamber and a central axially disposed port through one end thereof opening into the larger end of the said valve chamber through which water under pressure is constantly available to the said valve chamber, a frusto-conical selector valve element seatable on the tapered sides of the said valve chamber in sealed relationship thereto over the said ports therein having a fluid passage therethrough between the larger end thereof and the tapered side thereof and an arcuate fluid passage therein along a portion of the periphery thereof alignable with ports in the said valve housing when the said selector valve element is seated on the tapered sides of the said valve chamber, a poppet valve element journaled centrally on the said frusto-conical valve element seatable against the larger end of the said valve chamber in sealed relationship over the said central axially disposed port therein, and a mounting stem on the said frusto-conical selector valve element rotatably and axially slidably mounted through the smaller end of the said housing, a control means comprising a thrust ring journaled on the valve housing and a lever operated toggle mechanism pivoted to the mounting stem of the said frusto-conical valve element and linked to the said thrust ring, the said toggle mechanism being arranged to prevent axial movement of the said frusto-conical valve element responsive to water pressure against the said poppet valve element after the poppet valve carried by the frusto-conical valve element has sealed the axially disposed port in the larger end of the said valve chamber.

3. In a water softener control valve of the type including a housing having a tapered cylindrical valve chamber therein and a plurality of ports therethrough opening into the tapered sides of the said valve chamber and a central axially disposed port through one end thereof opening into the larger end of the said valve chamber through which water under pressure is constantly available to the said valve chamber, a frusto-conical selector valve element seatable on the tapered sides of the said valve chamber in sealed relationship thereto over the said ports therein having a fluid passage therethrough between the larger end thereof and the tapered side thereof and an arcuate fluid passage therein along a portion of the periphery thereof alignable with ports in the said valve housing when the said selector valve element is seated on the tapered sides of the said valve chamber, a poppet valve element journaled centrally on the said frusto-conical valve element seatable against the larger end of the said valve chamber in sealed relationship over the said central axially disposed port therein, and a mounting stem on the said frusto-conical selector valve element rotatably and axially slidably mounted through the smaller end of the said housing, a control means comprising an operating lever pivotally connected to the mounting stem of the said frusto-conical selector valve element, a thrust ring journaled on the valve housing, and toggle linkage pivotally connected to the said thrust ring and the said operating lever whereby to cause axial movement of the frusto-conical selector valve element when the said operating lever is pivoted in respect to the mounting stem of the said frusto-conical selector valve element.

4. In a water softener control valve of the type including a housing having a tapered cylindrical valve chamber therein and a plurality of ports therethrough opening into the tapered sides of the said valve chamber and a central axially disposed port through one end thereof opening into the larger end of the said valve chamber through which water under pressure is constantly available to the said valve chamber, a frusto-conical selector valve element seatable on the tapered sides of the said valve chamber in sealed relationship thereto over the said ports therein having a fluid passage therethrough between the larger end thereof and the tapered side thereof and an arcuate fluid passage therein along a portion of the periphery thereof alignable with ports in the said valve housing when the said selector valve element is seated on the tapered sides of the said valve chamber, a poppet valve element journaled centrally on the said frusto-conical valve element seatable against the larger end of the said valve chamber in sealed relationship over the said central axially disposed port therein, and a mounting stem on the said frusto-conical selector valve element rotatably and axially slidably mounted through the smaller end of the said housing, a control means comprising an operating lever pivotally connected to the mounting stem of the said frusto-conical selector valve element, a thrust ring journaled on the valve housing, and toggle linkage pivotally connected to the said thrust ring and the said operating lever arranged to cause axial movement of the frusto-conical selector valve element when the said operating lever is pivoted in respect to the mounting stem of the said frusto-conical selector valve element, the said pivotal connections between the operating lever and the mounting stem of the frusto-conical selector valve element and between the said toggle linkage and the operating lever and the thrust ring being disposed in alignment when the operating lever is pivoted to a position substantially at right angles to the mounting stem of the frusto-conical selector valve whereby to maintain the poppet valve element carried by the frusto-conical selector valve element seated when the operating lever is moved to and left in the said right angle position with respect to the mounting stem of the frusto-conical selector valve element.

5. In a water softener control valve of the type including a housing having a tapered cylindrical valve chamber therein and a plurality of ports therethrough opening into the tapered sides of the said valve chamber and a centrally axially disposed port through one end thereof opening into the larger end of the said valve chamber through which water under pressure is constantly available to the said valve chamber, a frusto-conical selector valve element seatable on the tapered sides of the said valve chamber in sealed relationship thereto over the said ports therein having a fluid passage therethrough between the larger end thereof and the tapered side thereof and an arcuate fluid passage therein along a portion of the periphery thereof alignable with ports in the said valve housing when the said selector valve element is seated on the tapered sides of the said valve chamber, a poppet valve element journaled centrally on the said frusto-conical valve element seatable against the larger end of the said valve chamber in sealed relationship over the said central axially disposed port therein, and a mounting stem on the said frusto-conical selector valve element rotatably and axially slidably mounted through the smaller end of the said housing, a control means comprising a thrust ring journaled on the valve housing, an operating lever pivotally connected to the mounting stem of the said frusto-conical selector valve element and linked to the said thrust ring whereby the manual pivoting of the said operating lever in one direction with respect to the said mounting stem moves the said frusto-conical selector valve element axially within the valve chamber into seated relationship with respect to the tapered sides of the valve chamber and the manual pivoting of the said operating lever in the other direction with respect to the said mounting stem moves the said poppet valve carried by the said frusto-conical selector valve axially into seated relationship against the said larger end of the said valve chamber.

6. In a water softener control valve of the type including a housing having a tapered cylindrical valve chamber therein and a plurality of ports therethrough opening into the tapered sides of the said valve chamber and a central axially disposed port through one end thereof opening into the larger end of the said valve chamber through which water under pressure is constantly available to the said valve chamber, a frusto-conical selector valve element seatable on the tapered sides of the said valve chamber in sealed relationship thereto over the said ports therein having a fluid passage therethrough between the larger end thereof and the tapered side thereof and an arcuate fluid passage therein along a portion of the periphery thereof alignable with ports in the said valve housing when the said selector valve element is seated on the tapered sides of the said valve chamber, a poppet valve element journaled centrally on the said frusto-conical valve element seatable against the larger end of the said valve chamber in sealed relationship over the said central axially disposed port therein, and a mounting stem on the said frusto-conical selector valve element rotatably and axially slidably mounted through the smaller end of the said housing, a control means comprising a thrust ring journaled on the valve housing through which the end of the mounting stem of the frusto-conical selector valve element extends, an operating lever pivotally connected to the said mounting stem, toggle linkage pivotally connected to the said thrust ring and the said operating lever arranged to cause axial movement of the frusto-conical valve element when the said operating lever is pivoted in respect to the mounting stem of the said frusto-conical selector valve element, the said pivotal connections between the operating lever and the mounting stem of the frusto-conical selector valve element and between the said toggle linkage and the operating lever and the thrust ring being disposed in alignment when the operating lever is pivoted to a position substantially at right angles to the mounting stem of the frusto-conical selector valve whereby to maintain the poppet valve element carried by the frusto-conical selector valve element seated when the operating lever is moved to and remains in the said substantially right angle position with respect to the mounting stem of the frusto-conical selector valve element, the said operating lever being free to permit the frusto-conical valve element to seat on the tapered sides of the valve chamber responsive to water pressure against the larger end thereof when the said operating lever is manually positioned other than substantially at a right angle to the said mounting stem of the frusto-conical valve element.

7. In a water softener control valve of the type including a housing having a tapered cylindrical valve chamber therein and a plurality of ports therethrough opening into the tapered sides of the said valve chamber and a central axially disposed port through one end thereof opening into the larger end of the said valve chamber through which water under pressure is constantly available to the said valve chamber, a frusto-conical selector valve element seatable on the tapered sides of the said valve chamber in sealed relationship thereto over the said ports therein having a fluid passage therethrough between the larger end thereof and the tapered side thereof and an arcuate fluid passage therein along a portion of the periphery thereof alignable with ports in the said valve housing when the said selector valve element is seated on the tapered sides of the said valve chamber, a poppet valve element journaled centrally on the said frusto-conical valve element seatable against the larger end of the said valve chamber in sealed relationship over the said central axially disposed port therein, and a mounting stem on the said frusto-conical selector valve element rotatably and axially slidably mounted through the smaller end of the said housing, a control means comprising a thrust ring journaled on the valve housing through which the end of the mounting stem of the frusto-conical selector valve element extends, an operating lever including a yoke at the inner end thereof, a pivot pin extending transversely through said mounting stem on the longitudinal axis thereof and eccentrically through said yoke pivotally connecting the said operating lever to the said mounting stem, a pair of links including pivots therefor pivotally connecting the said links to the said yoke and to the said thrust ring with the said pivots all disposed on an axis parallel with the axis of the said pivot pin on the longitudinal axis of the mounting stem of the said frusto-conical selector valve element when the operating lever is positioned substantially normal to the said longitudinal axis of the mounting stem of the frusto-conical selector valve element, the pivots connecting the said links to the said yoke engaging the said yoke outwardly with respect to the said pivot pin when the operating lever is positioned substantially normal to the said longitudinal axis of the mounting stem of the frusto-conical selector valve element.

8. A control valve comprising a valve housing having a tapered cylindrical valve chamber therein and a plurality of ports opening into the tapered sides of the said valve chamber, the said housing having an axially disposed port through the larger end thereof opening into the said tapered cylindrical valve chamber and communicating with a fluid pressure line, a frusto-conical selector valve element seatable on the tapered sides of the said valve chamber in sealed relationship over the said ports therein having a fluid passage therethrough between the larger end thereof and the tapered side thereof and an arcuate fluid passage along a portion of the periphery thereof, a poppet valve element journaled on the said frusto-conical selector valve element seatable against the larger end of the said valve chamber in sealed relationship over the said axially disposed port therein, a mounting stem on said frusto-conical selector valve element rotatably and axially slidably mounted through the smaller end of the said housing, and manual valve control means axially moving the said frusto-conical valve element into and out of seated relationship with respect to the tapered sides of the said valve chamber and the poppet valve element thereof out of and into seated relationship with respect to the larger end of the valve chamber, the said valve control means being adapted to turn the said frusto-conical valve element to selected positions when the poppet valve element carried thereby is seated comprising a thrust ring journaled on the valve housing through which the end of the mounting stem of the frusto-conical selector valve element extends, an operating lever including a yoke at the inner end thereof, a pivot pin extending transversely through said mounting stem on the longitudinal axis thereof and eccentrically through said yoke pivotally connecting the said operating lever to the said mounting stem, a pair of links including pivots therefor pivotally connecting the said links to the said yoke and to the said thrust ring with the said pivots all disposed on an axis parallel with the axis of the said pivot pin on the longitudinal axis of the mounting stem of the said frusto-conical selector valve element when the operating lever is positioned substantially normal to the said longitudinal axis of the mounting stem of the frusto-conical selector valve element, the pivots connecting the said links to the said yoke engaging the said yoke outwardly with respect to the said pivot pin when the operating lever is positioned substantially normal to the said longitudinal axis of the mounting stem of the frusto-conical selector valve element.

9. A multiport control valve comprising a housing having an annular tapered sided valve chamber therein and a plurality of ports therethrough opening into the tapered sides of said valve chamber, a frusto-conical selector valve core element normally seated on the tapered sides of said valve chamber in sealing relationship thereto having at least one fluid passage therein adapted to selectively connect some of the ports of said housing in communication, and an axial stem connected to said core element extending through said housing; said housing chamber extending beyond the larger end of said core element; said stem being capable of axially moving said core element relative to said housing so as to unseat said core element relative to said housing tapered sides and to rotate said core element relative to said housing to selectively position said core element passages relative to said housing.

10. In a device as set forth in claim 9, a fluid inlet port in the housing leading into said chamber at the larger end of said core element enabling fluid to exert pressure on the larger end of said core element to urge said core element into seated relationship in said tapered sided valve chamber.

11. A control valve housing having peripheral multiports and a single axial port and having a frusto-conical valve chamber therein; a rotary frusto-conical valve element contained in said chamber, said element having passages therein registrable with selected ports in said housing; means carried at one end of said element adapted to seal said axial single port; and means at the other end of said element operable independently to rotate and axially shift said element.

12. The control valve as set forth in claim 11, wherein said first mentioned means comprises a poppet valve rotatably mounted on said valve element.

13. The control valve as set forth in claim 11, wherein said last mentioned means includes a stem journalled in said valve housing and extending therethrough; and an operating lever pivotally mounted on said stem.

14. The control valve as set forth in claim 13, wherein the lever is eccentrically pivoted on said stem and said means also includes link means connecting said lever and said housing.

EARL C. REYNOLDS.

REFERENCES CITED

The following references are of record in the file of this patent:

UNITED STATES PATENTS

| Number | Name | Date |
|---|---|---|
| 667,075 | Emery | Jan. 29, 1901 |
| 1,336,236 | Johnson | Apr. 6, 1920 |
| 1,337,952 | Popp | Apr. 20, 1920 |
| 1,730,534 | Rossenbaum | Oct. 8, 1929 |
| 1,932,404 | Hamblin | Oct. 31, 1933 |
| 2,051,155 | Staegemann | Aug. 18, 1936 |
| 2,243,815 | Griswold | May 27, 1941 |
| 2,278,789 | Kuhnle | Apr. 7, 1942 |
| 2,490,726 | Bauberger | Dec. 6, 1949 |

FOREIGN PATENTS

| Number | Country | Date |
|---|---|---|
| 934,656 | France | of 1948 |